US010800136B2

(12) United States Patent
Waggoner

(10) Patent No.: US 10,800,136 B2
(45) Date of Patent: Oct. 13, 2020

(54) LAYERED STRUCTURES

(71) Applicant: Corumat, Inc., Pomona, CA (US)

(72) Inventor: Michael Waggoner, Seattle, WA (US)

(73) Assignee: Corumat, Inc., Pomona, CA (US)

( * ) Notice: Subject to any disclaimer, the term of this patent is extended or adjusted under 35 U.S.C. 154(b) by 771 days.

(21) Appl. No.: 14/930,610

(22) Filed: Nov. 2, 2015

(65) Prior Publication Data

US 2016/0121577 A1     May 5, 2016

Related U.S. Application Data

(60) Provisional application No. 62/073,872, filed on Oct. 31, 2014.

(51) Int. Cl.
*B32B 5/20* (2006.01)
*C08J 9/00* (2006.01)
(Continued)

(52) U.S. Cl.
CPC ............... *B32B 5/20* (2013.01); *B29C 44/02* (2013.01); *B32B 5/145* (2013.01); *B32B 27/065* (2013.01);
(Continued)

(58) Field of Classification Search
CPC ......... B32B 5/20; B32B 5/145; B32B 27/065; B32B 2262/067; B32B 2262/101; B32B 2266/0264; B32B 2307/306; B32B 2307/50; B32B 2307/538; B32B 2307/558; B32B 2307/704; B32B 2307/7163;
(Continued)

(56) References Cited

U.S. PATENT DOCUMENTS

| 3,651,183 A | 3/1972 | Hosoda et al. |
| 3,883,625 A | 5/1975 | Thomas et al. |

(Continued)

FOREIGN PATENT DOCUMENTS

| EP | 14 81 4566 | 2/2017 |
| JP | H10-235668 A | 9/1998 |

(Continued)

OTHER PUBLICATIONS

Cha, S. W., "A microcellular foaming/forming process performed at ambient temperature and a super-microcellular foaming process," Dissertation, Massachusetts Institute of Technology, Apr. 1994, 164 pages.

(Continued)

*Primary Examiner* — Allison G Fitzsimmons

(57) ABSTRACT

Disclosed, among other things, are ways to manufacture layered structures. In one embodiment, a foaming process may produce layered structures in reduced density plastics with or without integral skins. In another embodiment, a foaming process may produce deep draw structures in reduced density plastics with or without integral skins. In yet another embodiment, a foaming process may utilize additives, blends, or fillers, for example. In yet another embodiment, a foaming process may involve saturating a semi-crystalline polymer such as Polylactic Acid (PLA) with high levels of gas, and then heating, which may produce a reduced density plastic having high levels of crystallinity. These processes may be used to generate products with layered structures.

35 Claims, 13 Drawing Sheets

(51) Int. Cl.
  B32B 5/14 (2006.01)
  B32B 27/06 (2006.01)
  B65D 65/38 (2006.01)
  C08J 9/12 (2006.01)
  C08J 9/34 (2006.01)
  C08J 9/36 (2006.01)
  F16J 15/10 (2006.01)
  B29C 44/02 (2006.01)
  F16J 15/40 (2006.01)
  B29L 31/00 (2006.01)
  B29K 105/04 (2006.01)
  B29C 44/34 (2006.01)
  B29K 67/00 (2006.01)

(52) U.S. Cl.
  CPC ............... *B65D 65/38* (2013.01); *C08J 9/00* (2013.01); *C08J 9/0061* (2013.01); *C08J 9/0066* (2013.01); *C08J 9/0085* (2013.01); *C08J 9/122* (2013.01); *C08J 9/34* (2013.01); *C08J 9/365* (2013.01); *F16J 15/102* (2013.01); *F16J 15/40* (2013.01); *B29C 44/3453* (2013.01); *B29K 2067/046* (2013.01); *B29K 2105/04* (2013.01); *B29K 2105/045* (2013.01); *B29K 2995/006* (2013.01); *B29L 2031/7132* (2013.01); *B32B 2262/067* (2013.01); *B32B 2262/101* (2013.01); *B32B 2266/0264* (2013.01); *B32B 2307/306* (2013.01); *B32B 2307/50* (2013.01); *B32B 2307/538* (2013.01); *B32B 2307/558* (2013.01); *B32B 2307/704* (2013.01); *B32B 2307/7163* (2013.01); *B32B 2307/72* (2013.01); *B32B 2307/7244* (2013.01); *B32B 2307/7246* (2013.01); *B32B 2307/75* (2013.01); *B32B 2435/02* (2013.01); *B32B 2439/00* (2013.01); *B32B 2439/70* (2013.01); *C08J 2201/032* (2013.01); *C08J 2203/06* (2013.01); *C08J 2205/044* (2013.01); *C08J 2205/048* (2013.01); *C08J 2207/00* (2013.01); *C08J 2300/16* (2013.01); *C08J 2367/04* (2013.01); *C08J 2400/16* (2013.01); *C08J 2403/02* (2013.01); *C08J 2467/02* (2013.01); *Y02W 90/12* (2015.05)

(58) Field of Classification Search
  CPC ........ B32B 2307/72; B32B 2307/7244; B32B 2307/7246; B32B 2307/75; B32B 2435/02; B32B 2439/00; B32B 2439/70; B29C 44/02; B65D 65/38; C08J 9/00; C08J 9/0061; C08J 9/0066; C08J 9/0085; C08J 9/122; C08J 9/34; C08J 9/365; C08J 2201/032; C08J 2203/06; C08J 2203/044; C08J 2203/048; C08J 2207/00; C08J 2300/16; C08J 2367/04; C08J 2400/16; C08J 2403/02; C08J 2466/02; F16J 15/102; Y02W 90/12; B28C 44/3453; B29K 2105/045; B29K 2885/006; B29K 2995/006; B29L 2031/7132
  See application file for complete search history.

(56) References Cited

U.S. PATENT DOCUMENTS

| | | | |
|---|---|---|---|
| 4,455,272 A | | 6/1984 | Schubert et al. |
| 5,444,113 A | * | 8/1995 | Sinclair .................. A61L 15/26 524/306 |
| 5,723,510 A | | 3/1998 | Kabumoto et al. |
| 5,866,053 A | | 2/1999 | Park et al. |
| 6,232,354 B1 | | 5/2001 | Tan |
| 7,670,545 B2 | | 3/2010 | Bopp et al. |
| 8,080,194 B2 | | 12/2011 | Nadella et al. |
| 8,377,548 B2 | | 2/2013 | Nadella et al. |
| 8,858,849 B2 | | 10/2014 | Nadella et al. |
| 8,877,331 B2 | | 11/2014 | Nadella et al. |
| 8,926,876 B2 | | 1/2015 | Kumar et al. |
| 9,770,854 B2 | | 9/2017 | Branch |
| 2007/0148384 A1 | * | 6/2007 | Bowden ............... B65D 65/466 428/35.7 |
| 2007/0179253 A1 | | 8/2007 | Matsuoka et al. |
| 2009/0104420 A1 | | 4/2009 | Nadella et al. |
| 2009/0309250 A1 | | 12/2009 | Nadella et al. |
| 2010/0052201 A1 | | 3/2010 | Nadella |
| 2010/0062235 A1 | * | 3/2010 | Nadella .................. B32B 27/06 428/213 |
| 2010/0086758 A1 | | 4/2010 | Takase et al. |
| 2010/0136338 A1 | * | 6/2010 | Hirai ...................... B29B 9/065 428/402 |
| 2010/0297416 A1 | * | 11/2010 | Kumar .................... B32B 27/08 428/220 |
| 2011/0003133 A1 | | 1/2011 | Kumar et al. |
| 2012/0225961 A1 | | 9/2012 | Van Horn et al. |
| 2013/0303643 A1 | | 11/2013 | Nadella et al. |
| 2013/0303645 A1 | * | 11/2013 | Dix ........................ B29C 44/56 521/145 |
| 2014/0377530 A1 | | 12/2014 | Waggoner |
| 2016/0045879 A1 | | 2/2016 | Kumar et al. |
| 2016/0122489 A1 | | 5/2016 | Waggoner |

FOREIGN PATENT DOCUMENTS

| | | |
|---|---|---|
| JP | 2006-044726 A | 2/2006 |
| WO | WO 2014/205180 A3 | 12/2014 |

OTHER PUBLICATIONS

Final Office Action dated Nov. 1, 2016 for U.S. Appl. No. 14/308,959, 13 pages.
Final Office Action dated Feb. 20, 2018 for U.S. Appl. No. 14/308,959, 15 pages.
Materials Safety Data Sheet for Polylactic Acid; Jul. 7, 2008, 2 pages.
Non-Final Office Action dated Feb. 16, 2016 for U.S. Appl. No. 14/308,959, 6 pages.
Non-Final Office Action dated Jun. 1, 2017 for U.S. Appl. No. 14/308,959, 14 pages.
Partial Supplementary European Search Report dated Jan. 25, 2017 for European Application No. 14814566.7, 8 pages.
Non-Final Office Action dated Aug. 7, 2018 for U.S. Appl. No. 14/930,592, 20 pages.
"The Ideal Gas Law" by University of Waterloo; accessed at http://www.science.uwaterloo.ca/~cchieh/cact/c120/idealgas.html via Wayback Machine; 2004, 1 page.
Wang, X. et al., "Development of Crystallization in PLA During Solid-State Foaming Process Using Sub-Critical $CO_2$," Cellular Polymers, vol. 31, No. 1, pp. 1-18 (2012).
Third Party Submission Under 37 CFR 1.290 filed Apr. 12, 2018 for U.S. Appl. No. 14/930,592, 19 pages.
Non-Final Office Action dated Apr. 25, 2019 for U.S. Appl. No. 14/308,959, 18 pages.
Non-Final Office Action dated Oct. 18, 2018 for U.S. Appl. No. 14/308,959, 17 pages.

* cited by examiner

LAYERED STRUCTURES

CROSS-REFERENCE TO RELATED APPLICATION

This application claims priority to and the benefit of U.S. Provisional Application Serial No. 62/073,872, filed Oct. 31, 2014, entitled, "Reduced Density Thermoplastics," the disclosure of which is hereby incorporated by reference in its entirety.

FIELD

This disclosure relates generally to Layered Structures produced through solid-state foaming.

BACKGROUND

Plastics are widely used in both durable and non-durable applications. The majority of non-durable plastics are used in initial packaging of goods and food service packaging, often in single use applications.

The disposal of plastic products results in huge amounts of waste. Recyclable plastic products must be cleaned before recycling, which consumes additional energy. Due to incomplete cleaning and degradation of the polymers during processing, they are often unable to be recycled into similar quality goods.

Foam plastic products produced through conventional means utilizing a chemical blowing agent improve of the aspects of performance of solid plastic products by adding insulation, cushioning to their benefits, and reducing the amount of material and cost to generate products, but often create new problems. Foamed plastic may become friable, and form small pellets nearly impossible to separate from a waste stream. The surface of foamed plastics is often cellular and unattractive to customers, and does not create packages durable enough for many food packaging applications such as yogurt packaging.

The chemical blowing agents, fluorocarbons and chlorofluorocarbons used in producing many foams have negative environmental effects, and the contamination of plastics from these blowing agents may render them non-recyclable. Traditional foaming technologies, such as extrusion foaming, generate a monolithic foaming structure. This cellular structure is efficient at reducing the density of a material, but it leads to a surface that is not suited for high-quality graphics, good impact resistance, or applying coatings to improve the performance of products.

Solid state foaming utilizing carbon dioxide, or other high-pressure gas, as a foaming agent has been explored as a resolution to some of the above problems. However, saturation of polymer sheet may be difficult to adapt to a conventional plastics factory.

Semi-continuous foaming is a method of interleaving a saturated roll of polymer with a gas-channeling means, which allows saturation of polymers prior to thermoforming. Semi-continuous production is a labor intensive process which consumes an interleaving layer and requires a large amount of plastic. Plastic loses gas during processing, and a large roll of plastic may take a long time to process, so the properties at the start of a foam roll may differ from those of the end of a roll. Layered structures in foam have been generated as described in U.S. Pat. No. 8,377,548. The images in this patent illustrate layered structures with skins. However, it can be viewed that the structures with a reduced density core contain a large number of small cells. These small cells are inefficient at reducing the density of a structure. The surface area of a cell is proportional to $4\pi r^2$, while the volume of a sphere is $$4\pi \frac{r^3}{3}.$$

A small cell contains much less volume for a given amount of material, resulting in relatively high density structures. However, these small cells lead to products with superior properties relative to those described supra.

The problems concerning the utilization of plastics in packaging, in both foam and solid form, extend to durable goods as well. A particular area of plastic usage for durable goods is composites, in which multiple phase separated materials are bonded together to create a single part with better properties. The center section of these parts is often foam. Most foams produced for these applications cannot be recycled after bonding, and are not biodegradable.

SUMMARY

The instant application discloses, among other things, Layered Structures. According to one embodiment, a foaming process may produce layered structures in reduced density plastics with or without integral skins. In another embodiment, a foaming process may produce deep draw structures made from reduced density plastics with or without integral skins. In yet another embodiment, a foaming process may utilize additives, blends, or fillers, which may include polymer additives, polymer blends of thermoplastics including bioplastics, solid fillers, or additives which may allow high rates of gas diffusion into and out of thermoplastics, for example. In yet another embodiment, a coating is applied to a layered structure to improve its resistance to moisture and oxygen transmission. In yet another embodiment, a foaming process may involve saturating a polymer such as PLA with high levels of gas, and then heating, which may produce a reduced density plastic having high levels of crystallinity. There are existing reduced density polymer structures available to producing products, allowing cost savings and efficiency benefits which may be provided by reducing density. But the instant application provides configurations of reduced density objects that provide performance advantages over prior structures.

These techniques may be utilized with any thermoplastic. Utilizing these techniques with a biodegradable polymer such as PLA or a blend may result in low density, high strength, or heat-resistant compostable structures.

BRIEF DESCRIPTION OF THE DRAWINGS

Like reference numerals are used to designate like parts in the accompanying drawings.

DETAILED DESCRIPTION

Figure 1:
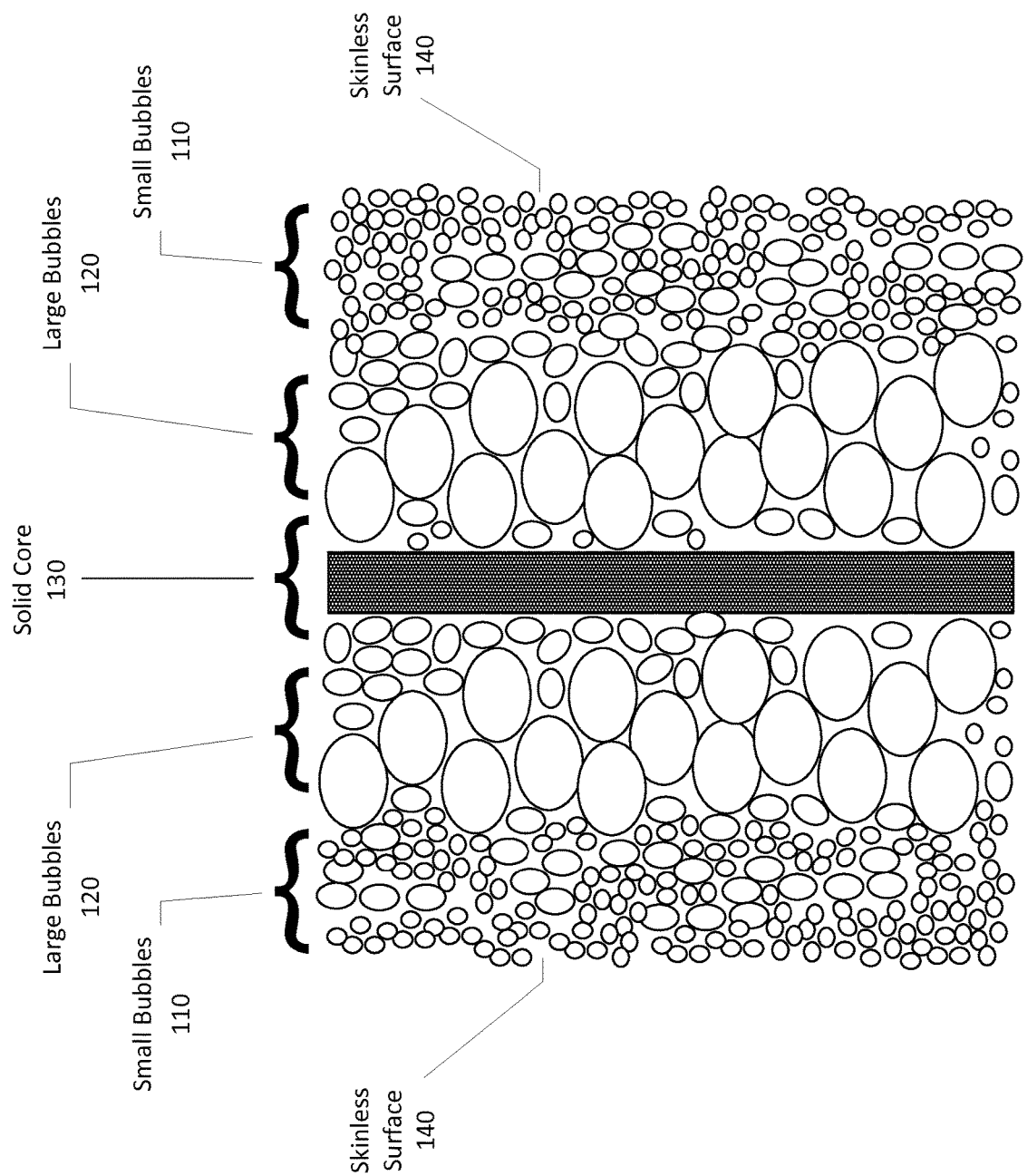
FIG. 1 illustrates an example of Layered Structure in reduced density polymers having no integral skins, according to one embodiment.

A more particular description of certain embodiments of Layered Structures may be had by references to the embodiments described below, and those shown in the drawings that form a part of this specification, in which like numerals represent like objects.

FIG. 1 illustrates an example of Layered Structure in reduced density polymers having no integral skins, according to one embodiment.

Two layers of Small Bubbles 110 may surround a core of Large Bubbles 120, which in turn may surround a Solid Core 130. Small Bubbles 110 may be approximately up to 50 μm in diameter, while Large Bubbles 120 may be larger than 51 μm in diameter. It may be recognized that asymmetric structures could be generated by heating one side of the polymer more than the other, or by modifying the polymer through the use of additives.

The skin's cellular structure may be generated by heating a polymer in a bath for an extended period; gas which may have left the surface prior to heating may be replaced by gas diffusing outward from the polymer core.

Structures may be generated with an open cellular structure by rapidly venting a pressure vessel while depressurizing a polymer, and then heating the polymer further.

Large cells at the surface of polymer samples may yield a product that is porous and not capable of holding water since the large cells may rupture when subjected to rapid depressurization. Thus, it may be desirable that a layer with sufficient crystallinity is generated near the surface of the polymer to enable rapid depressurization without ruptured cells.

In polylactic acid saturated at 650 PSI for ten minutes, rapid depressurization is depressurization that occurs in less than 10 seconds; slow depressurization is depressurization over periods longer than 10 seconds. This time may vary depending on polymer properties, and gas concentrations at the surface.

The techniques described in herein may be used to generate a plurality of layered structures in polymers without integral skins, as shown by Skinless Surface 140. The object created may avoid the necessity of laminating components together in other manufacturing methods. A crystallinity gradient may be generated throughout the cross section of the polymer, yielding different properties through the cross section. All layers may be integral with one another, while properties of each of the layers may be unique.

Layered Structures may include a single layer or multiple layers of cells with diameters under 100 micrometers without skins, and also may include a solid core without skins. Layered Structures may include structures composed entirely of cells over 100 micrometers in diameter. Layered Structures may include structures that may incorporate cells under 100 micrometers, cells over 100 micrometers, may have no skins, and may have a solid core.

Layered Structures may include polymers with porous skins and ruptured internal cellular structures.

Figure 2:
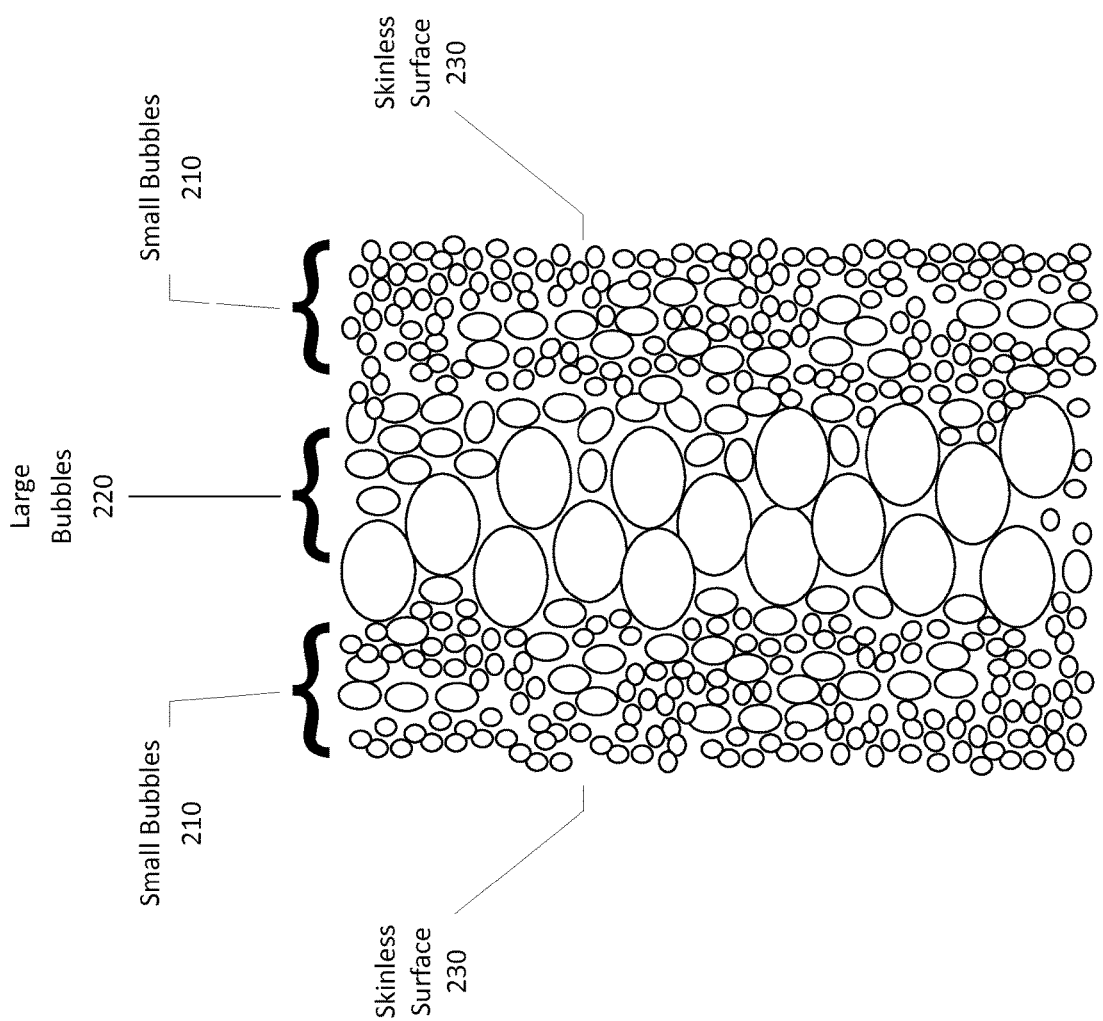
FIG. 2 illustrates an example of Layered Structure in low-density thermoplastics having no integral skins, according to another embodiment.

FIG. 2 illustrates an example of Layered Structure in low-density thermoplastics having no integral skins, according to another embodiment. Two layers of Small Bubbles 210 may surround a core of Large Bubbles 220. Small Bubbles 210 may be approximately up to 50 μm in diameter, while Large Bubbles 220 may be larger than 51 μm in diameter. No skin may be present, as illustrated by Skinless Surface 230. A cellular structure with a single cell size or a range of cell sizes, with or without skins, may be generated.

Figure 3:
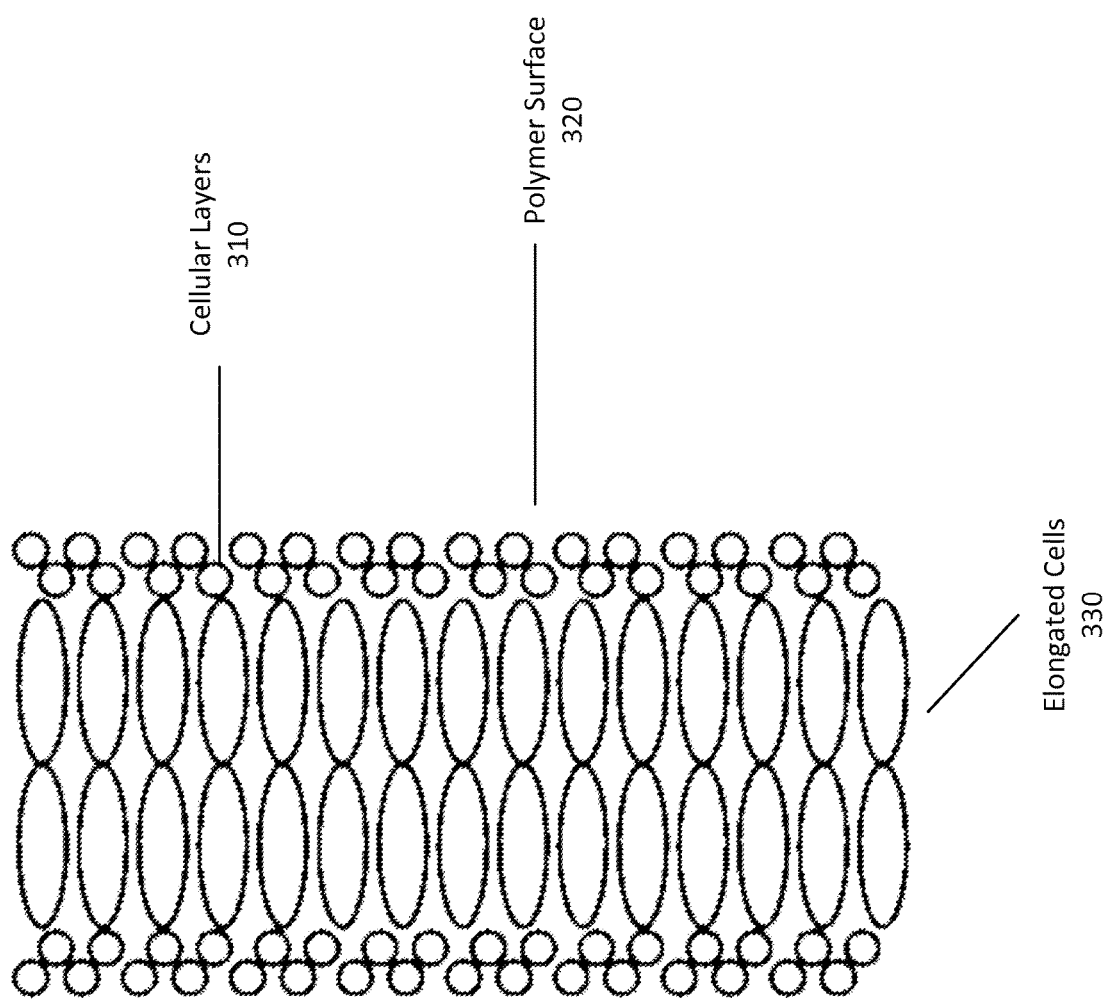
FIG. 3 illustrates Layered Structure of low-density thermoplastics containing elongated cells near the polymer core, according to one embodiment.

FIG. 3 illustrates Layered Structure of low-density thermoplastics containing elongated cells near the polymer core, according to one embodiment. In this embodiment, two Cellular Layers 310 may surround a core of Elongated Cells 330. Elongated Cells 330 may be composed of a single or many layers of cells which are oriented in a direction normal to the exterior surface of the cellular structure. Cellular Layers 310 may include single or multiple layers of cells of single or multiple sizes. Polymer Surface 320 may be composed of two exterior skin layers, an asymmetric structure wherein one side of the polymer includes a skin and the other does not, or a skin-free surface of a cellular layer.

This structure may result from having a high gas concentration at the surface of the polymer, and lower gas concentration near the center of the polymer during foaming of a saturated polymer. The lower gas concentration at the center of the polymer generates large cells which are constrained by an exterior surface which is less prone to expansion.

The elongated cell structure may include a solid core. One embodiment provides a layered structure in which at least 30 percent of the wall structure of a reduced density object is composed of elongated cells. This may provide good structural efficiency and a reduced density. This structure may be used in thermoformed structures, for example, those described in FIGS. 5 through 12. A cellular structure with a single cell size or a range of cells, with or without skins, may be generated.

Figure 4:
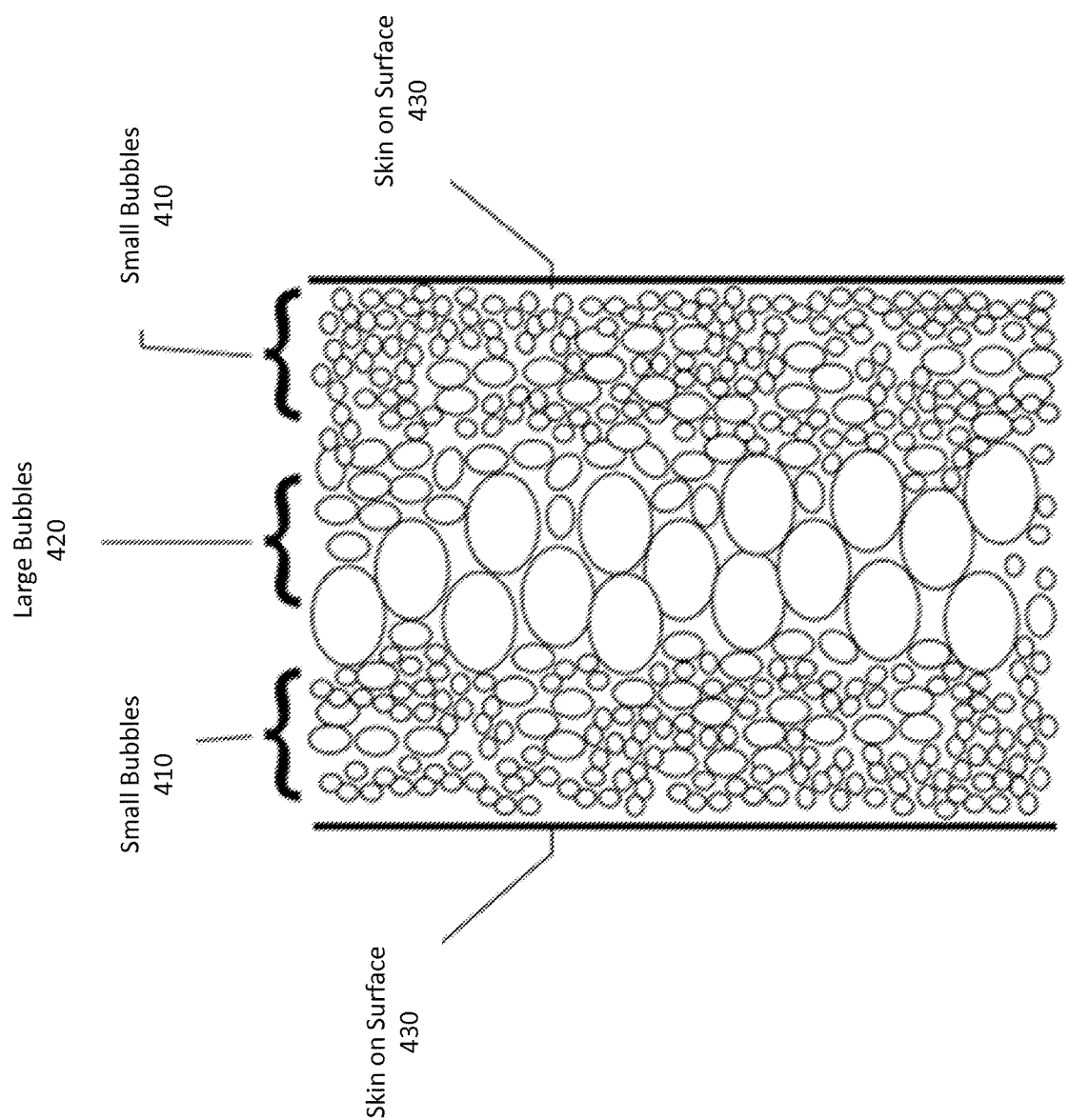
FIG. 4 illustrates an embodiment of Layered Structure in low-density thermoplastics with skins, according to one embodiment.

FIG. 4 illustrates one embodiment of Layered Structure in low-density thermoplastics. In this embodiment, two Skin on Surface Layers 430 surround two Cellular Layers 410, which in turn surround of a core of Elongated Cells 420. It may be recognized that the cellular layers may be modified by the use of additives, gas concentration levels, and heating conditions. It may also be possible to create a polymer structure with a skin on only a single side by only heating on a single side of a polymer. A cellular structure with a single cell size, or a range of cells, with or without skins may be generated.

While the examples described above have used structures with rectangular shapes, other shapes are also contemplated. For example, a sphere may be considered to have surfaces on opposite sides by considering slicing the sphere through a middle, or by taking a cylindrical sample through a middle, giving surfaces on each end of the cylinder.

Figure 5:
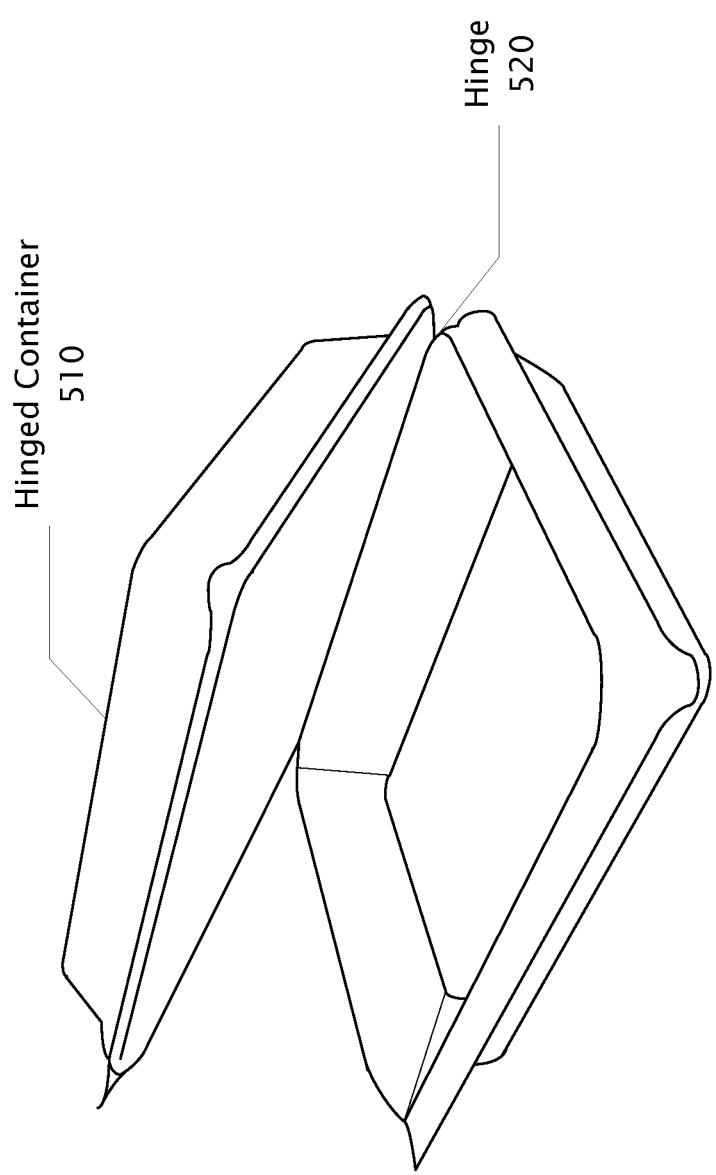
FIG. 5 illustrates a hinged container made from a polymer such as low-density PLA with sufficient crystallinity levels to withstand high temperatures, according to one embodiment.

FIG. 5 illustrates Hinged Container 510 made from a polymer, for example, reduced density PLA, with sufficient crystallinity levels to withstand plastic blend capable of withstanding temperatures of at least 75 C, according to one embodiment. In this example, Hinged Container 510 may be created by using crystallizable blends of PLA, saturating it with high levels of $CO_2$ or another gas, then heating. The heated sheet may be formed into a shape at any time, for example, immediately after saturation or after the sheet has cooled. Hinged Container 510 may include Hinge 520 and may be sufficiently ductile using neat PLA or another biopolymer.

Hinged Container 510 may have a wall thickness of as little as 0.010" inches if the material is of densities greater than 60% relative to that of solid plastic, or may have a wall thickness as great as 0.150" inches thick if the density of the material is lower than 20% relative to that of solid plastic.

Figure 6:
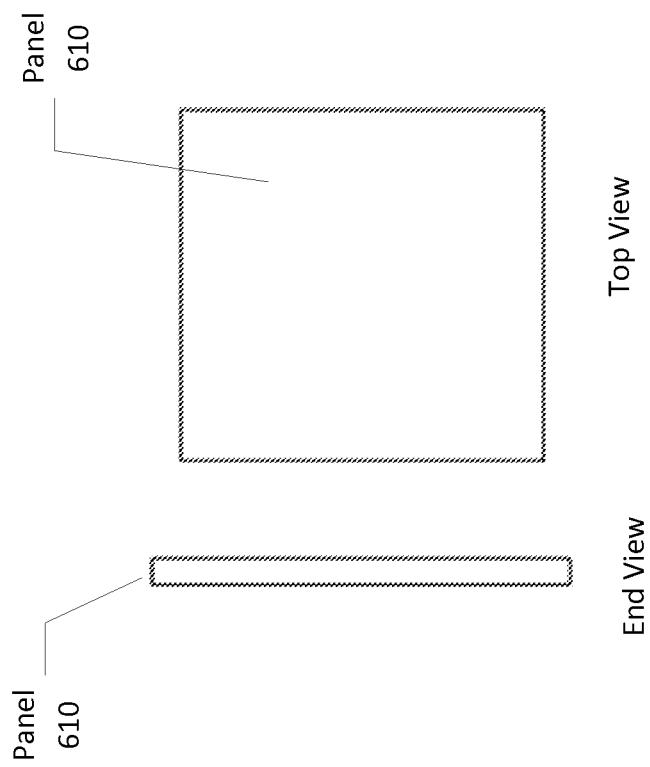
FIG. 6 illustrates a side view and a top view of Panel 3010 generated from low-density polymer composites, according to one embodiment.

FIG. 6 illustrates a side view and a top view of Panel 610 generated from low-density polymer composites, according to one embodiment.

Figure 7:
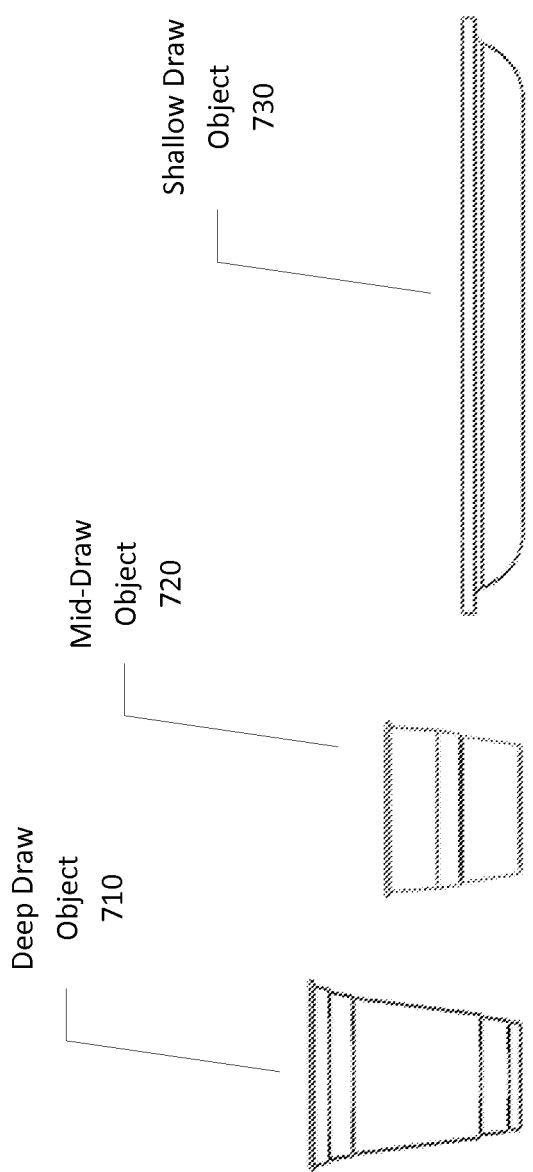
FIG. 7 is an illustration of objects that may be generated from low-density polymer composites, according to one embodiment.

FIG. 7 is an illustration of objects that may be generated from low-density polymer composites, according to one embodiment. Shown are Deep Draw Object 710, such as a drink cup, Mid-Draw Object 720, such as a soup bowl, and Shallow Draw Object 730, such as a plate. In one embodiment, low-density polymer composites may have a cellular structure, which may be layered, and which may withstand exposure to solids and liquids of at least 180° F., or 212° F. to hold boiling water, on one side of the structure. This material may be a highly crystallizable blend of PLA, with crystallizing additives, and may contain fillers. Although the shape of the objects may be described by their applications in foodservice, one having skill in the art will recognize that the objects may have many other applications. Deep draw objects such as planters may be created through these methods; incorporating polymer blends and/or fillers so the planters may degrade when planted in soil.

Shallow Draw Object may also include lids for Deep Draw Object 710, Mid-Draw Object 720, or similar objects produced from other materials. A lid for a hot beverage cup may be produced from a low-density thermoplastic structure that is sufficiently crystalline to withstand intermittent exposure to hot beverages. It may be possible to produce this part using a cold mold since crystallinity may be induced in the sheet prior to forming.

Compostable filler may be incorporated in any of these objects, which may lend a "papery" feel to the product and provide identification of the products to consumers. Talc of 1-30% concentration by weight has been found to be effective in one embodiment. This may provide a surface roughness greater than 0.5 microns, or a gloss of 30% or less at an angle of 60 degrees when measured with a gloss meter.

In another embodiment, a tray of two or more compartments, with a depth of draw of fewer than 3 inches in depth may be provided. Similar items may be used for foodservice items and lunch trays for school. The material may be a reduced density biodegradable polymer. The reduced polymer may be composed primarily of PLA, and may have a cross-sectional structure that may or may not include skins. The internal structure may be mono-cellular, may have mixed cells of different sizes, or may have a layered structure.

Figure 8:
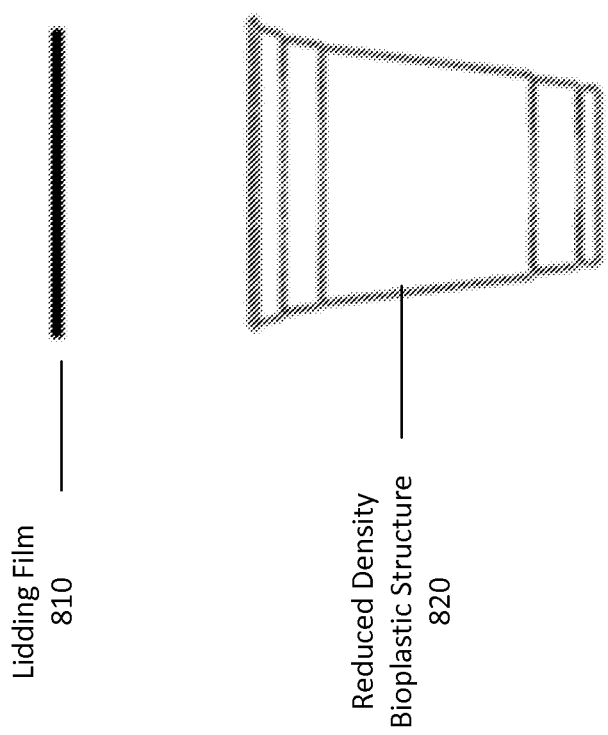
FIG. 8 illustrates one embodiment of a shaped object and lid produced from low-density thermoplastic structures.

FIG. 8 illustrates a shaped object and lid produced from low-density thermoplastic structures, according to one embodiment. Reduced Density Bioplastic Structure 820 may be an object such as Deep Draw Object 710 (such as a drink cup), Mid-Draw Object 720 (such as a soup bowl), and Shallow Draw Object 730 (such as a plate). Lidding Film 810 may be a foil, a conventional polymer, or a compostable material. Both Lidding Film 810 and Reduced Density Bioplastic Structure 820 may be of a composite material that has a high resistance to the passage of oxygen and/or moisture, or include a barrier coating or treatment on their interior or exterior surface which may increase resistance to the passage of oxygen and/or moisture. Lidding Film 810 may be attached to Reduced Density Bioplastic Structure 820 by mechanical means or adhesive. The adhesive and barrier coating or treatment may be compostable. For example, heat setting compostable adhesives are available from 3M®. An example compostable film that may be included in this structure is Natureflex® produced by Innovia Films. Barrier coatings have also been produced by spraying a bonding agent and clay particles to the surface of a package. The clay particles create a tortuous path for molecules to pass through, increasing the barrier properties of containers.

Lidding Film 810 and Reduced Density Bioplastic Structure 820 may be a reduced density structure that incorporate a solid barrier layer included in a layered reduced density structure. One embodiment of this may be shown in FIG. 1, in which the solid core may be a barrier layer. The polymer blank for this structure may be generated through a multi-layer extrusion process including a barrier layer.

One application of this structure may be in the field of single service beverage pods, such as those sold by Keurig®. The structure described above may include a filter element and be partially filled with coffee or another food substance. All elements and adhesives of the created object may be compostable.

Another application of this structure is in food service items in general. Example applications include dairy containers, containers used for soups, or noodle containers.

A reduced density thermoplastic structure may also provide a clear lid. The lid may snap onto or adhere to the container. In order to provide a thermally-resistant compostable structure, a crystalline lower structure, and a relatively amorphous clear lid may be used. The crystalline reduced-density thermoplastic structure may then support the lid at elevated temperatures.

Figure 9:
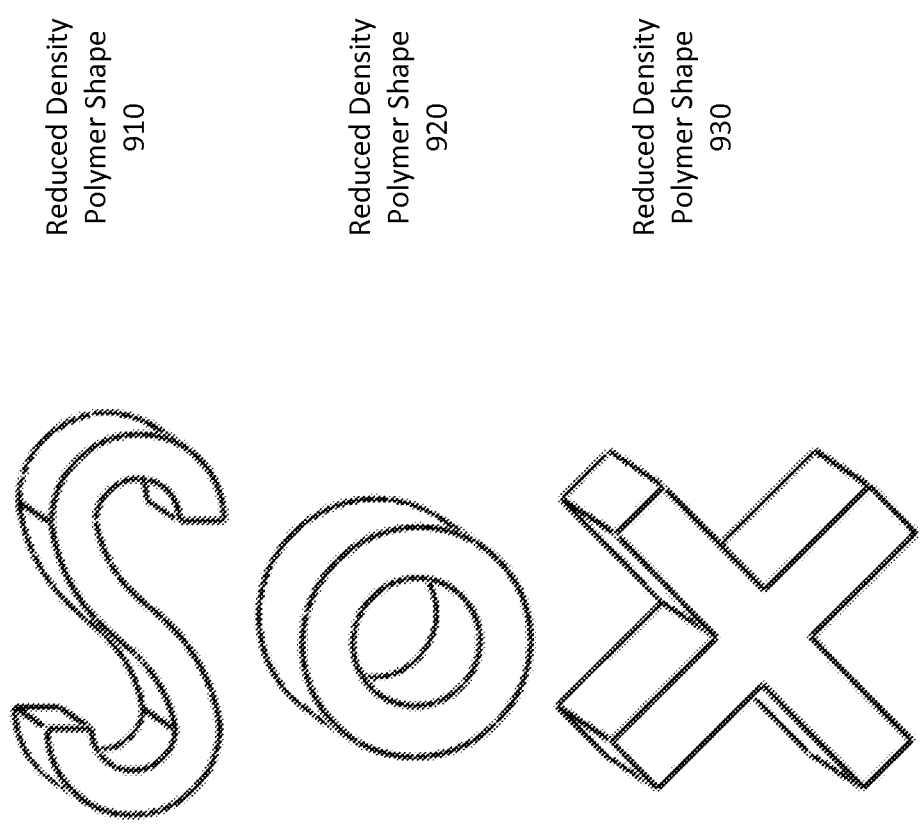
FIG. 9 illustrates shapes that may be useful in the application of low-density polymer objects.

FIG. 9 illustrates shapes that may be useful in the application of low-density polymer objects. Reduced Density Polymer Shape 910 is a shape that is similar to a packaging peanut. Reduced Density Polymer Shapes 920, 930 are other shapes that may be used as a packaging material.

These shapes may be generated, for example, by extruding a solid thermoplastic material, saturating it with high-pressure gas, and heating the resulting saturated polymer. The cross-sectional structure of these shapes may resemble Layered Structure as described above. The starting material may be bioplastic and/or compostable structures.

It may be useful to perform rapid saturation techniques in generating these shapes, starting with a shape that may be amorphous through most of its cross section and having crystallinity induced only at its surface during the saturation step. The shape may then be foamed in a heater for a long period of time, for example, one minute, allowing the entire core to foam. The crystallinity of the samples may be increased by heating and stretching to the point of the parts being stable over 65° C., which may allow shipping without refrigeration.

It may be efficient to batch foam these shapes, creating small pellet-like objects with the cross sections shown above, and feeding them through a pressure vessel in a series of locks. This may enable the continuous generation of packaging materials at relatively low cost. These shapes, or spheres, may be bonded or heat-fused together to generate shapes with complex geometries such as drink cups.

Figure 10:
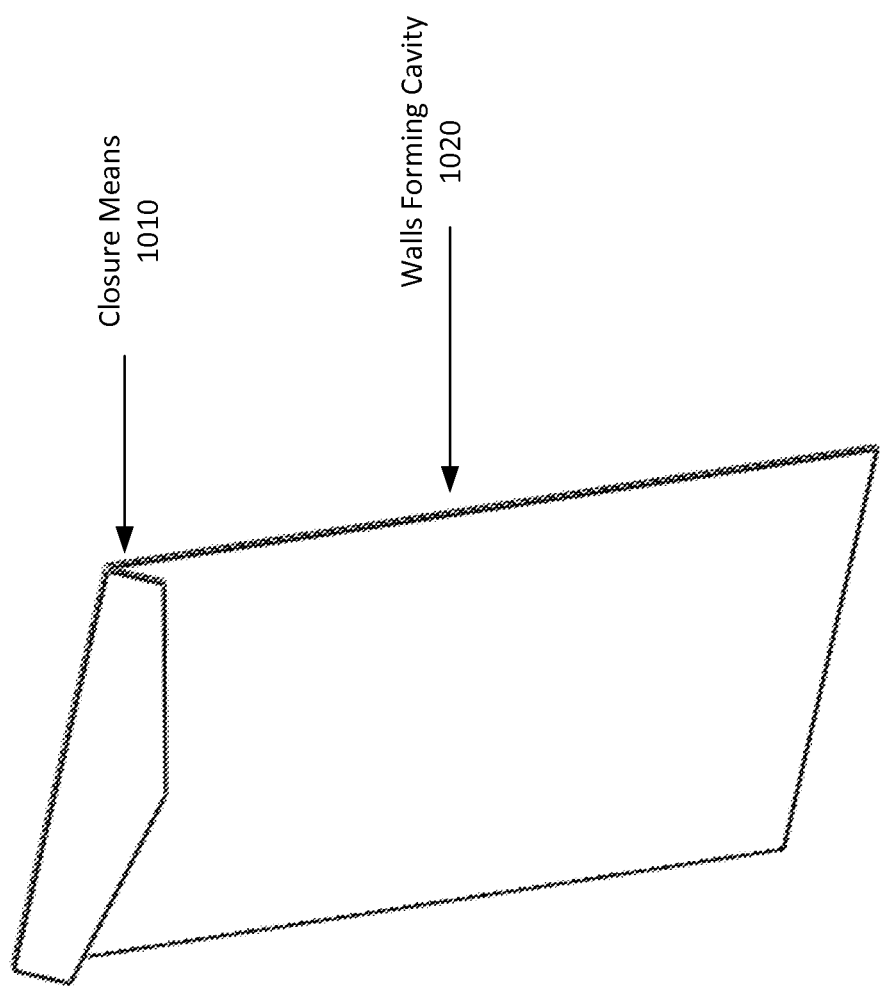
FIG. 10 illustrates an embodiment of a package that may be generated from reduced density film or panel.

FIG. 10 illustrates an embodiment of a package that may be generated from Panel 610. The reduced density in both of these structures may service to reduce the cost of shipping the package, while the cellular structure may provide cushioning to the contents of the package. Closure Means 1010 may be, for example, a moistenable glue, a clasp, a "peel and seal" closure, or any other means known in the industry. Walls Forming Cavity 1020 may provide a volume suitable for inserting papers or other objects.

Combining elements from each of the above groups of figures may be used to generate products. An example may be to generate a polymer blank from a blend of biodegradable thermoplastics and biodegradable elongated fillers, saturate it in a continuous saturation device, and heat while stretching. This may yield a film that may be biodegradable and stable at high temperatures.

Another embodiment of the invention is a structure generated from a blank composed of biodegradable polymer sheet with a starting thickness of 0.012-0.040" inches. The biodegradable polymer sheet may be PLA, PLA with crystallizers, PLA with fillers, or a blend of biodegradable polymers. The blank may be saturated with high-pressure carbon dioxide or another gas and possibly a solvent using rapid saturation techniques, for example, 900 PSI for 3 minutes including water vapor. The sheet may be heated in a bath with a temperature exceeding 70° C. for at least 5 seconds, for example, 99° C. for 45 seconds. The sheet may then be used as a component or thermoformed into a shape for use using a mold at temperatures below 70° C. and preferably 25° C. in order to allow rapid cycle times. The saturated sheet may also be thermoformed in a masking thermoformer with a mold with a temperature over 70° C., in order to induce crystallization in a shape and induce further foaming.

Another embodiment may be a foam film or panel with a relative density of 5-70 percent of that of solid PLA, and a thickness of 0.004 to 0.120 inches in thickness. The thin film may be generated by stretching during foaming. The reduced density film may include fillers, particularly additives which can be used to extend the polymer chains in PLA.

Figure 11:
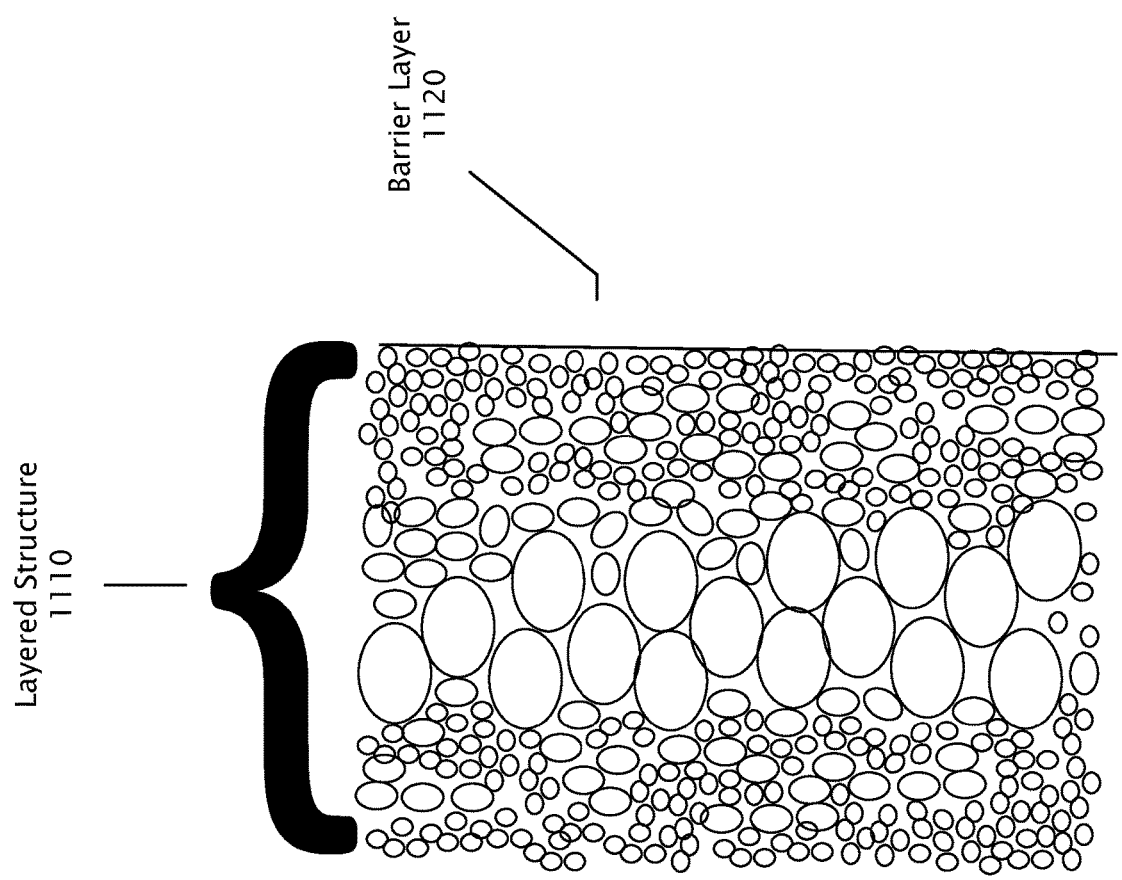
FIG. 11 illustrates an embodiment of a layered structure with an added barrier coating.

FIG. 11 illustrates one embodiment of Layered Structure in low-density thermoplastics. In this embodiment, Barrier Layer 1120 has been applied to a single side of Layered Structure 1110. Barrier Layer 1120 may be applied in the foam of a spray or laminated layer. Sprays including a polymer substrate and small particles of clay have been found to be effective as barrier layers through a mechanism of creating a "tortuous path" for oxygen, moisture, or other molecules to travel through a cross section of the material.

Layered Structure 1110 with applied Barrier Layer 1120 may improve performance of packaging for a given cost. Reducing the density of a structure generally lowers products costs and environmental impact. A layered structure may provide superior print quality, and impact and scratch resistance when compared to traditional foaming technologies. Barrier Layer 1120 may also protect packaging contents from undesirable chemical contact.

Figure 12:
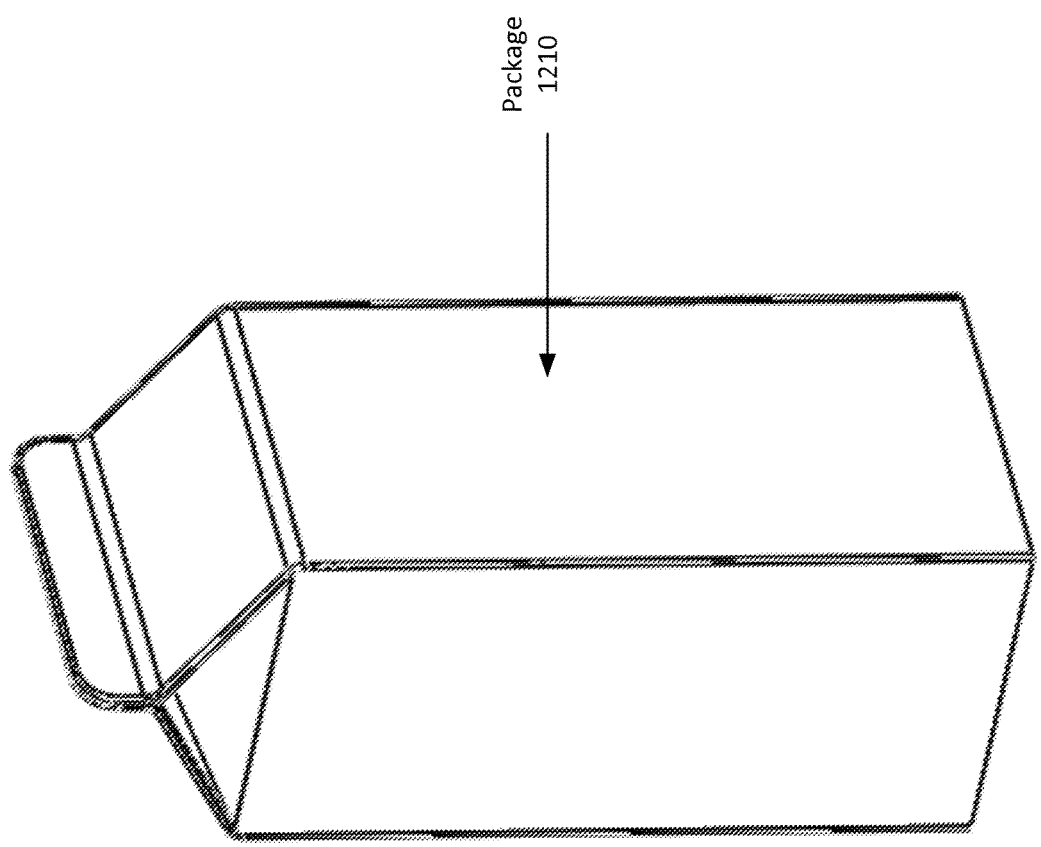
FIG. 12 illustrates an embodiment of a package that may be generated from a panel, through the folding of the panel and bonding of surfaces.

FIG. 12 illustrates an embodiment of Package 1210 that may be generated from Panel 610, through the folding of the panel and bonding of surfaces. Package 1210 may be used to dispense liquid or solid items.

It may be recognized that many variations of packages may be produced from folding of a Panel 610 in a manner similar to those that are used to produce products using paper and cardboard. These include a variety of paper, packages, and cartons, including, for example, paper coffee cups. It may be beneficial to directly heat-form a screw-type opening and accompanying lid into the wall of the container, or bond a separately formed screw-type opening in order to allow repeated opening and closing. It may also be helpful to generate a semi-rigid pouch using these methods, with a press-to-seal enclosure method commonly used on sandwich bags.

Plastic sheet is often extruded with a release layer on one or both sides of a sheet, so that a roll can be generated that does not stick to itself. It may be possible to generate containers or pouches by orienting sheet in a manner such that the non-release coated sides may be heat sealed together.

Figure 13:
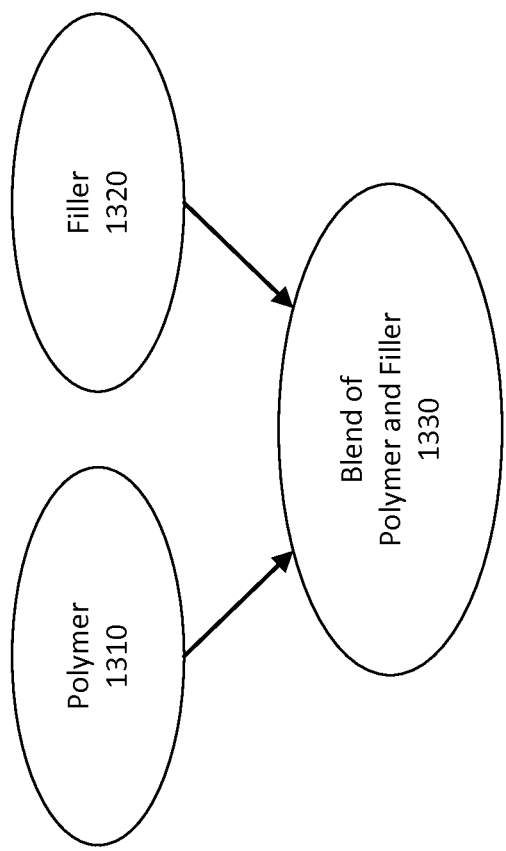
FIG. 13 is a flow diagram for generating blends of polymer and filler.

FIG. 13 is a block diagram for creating a polymer blank, according to one embodiment. A biodegradable polymer such as PLA may be combined with a solid filler and/or additive. The base polymer may be PLA or a combination of polymers that result in a Polymer 1310. Filler 1320 may be talc, algae, wood pulp, starch, or another solid filler that is biodegradable or does not interfere with degradation. A material may be chosen that is less expensive than the Biodegradable Polymer to reduce the cost of the end products. A Blend of Polymer and Filler 1330 may result. This may yield a composite structure that is shaped, of low density, and low cost.

In another embodiment, Filler 1330 may be elongated, and may include glass fibers, wood fibers, or another material with an aspect ratio of greater than 1:1.5. Elongated fillers may increase rigidity of the end product, which may be useful at elevated temperatures, where many biodegradable thermoplastic polymers become soft. A thermally stable composite 1330 may result.

In yet another embodiment, a polylactic acid polymer may combine with a biodegradable polymer filler to create a compostable polymer blend. Polylactic acid has limited performance in terms of temperature resistance, and additional characteristics may be desirable for some applications. Compostable filler may lend a "papery" feel, and provide identification of the product to consumers. For example, talc of 1-30% concentration by weight may be effective.

Combining PLA with a more rapidly degrading polymer or additive may lead to a product that degrades more rapidly, or in more varied environments than neat PLA. PLA/thermoplastic starch, or PLA/Polybutyl Succinate (PBS) blend may exhibit more rapid degradation than neat PLA. PBS/PLA blends, with greater than 30% PBS, have been demonstrated to exhibit higher service temperature than neat PLA. Polyhydroxyalkanoate blends with PLA may exhibit a lower environmental impact than pure PLA, and increased rates of degradation. PLA blended with a mix of at least one-half percent Polycaprolactone by weight may exhibit more rapid degradation, in a wider array of conditions, than pure PLA. PLA blended with an enzymatic and oxo-degradation agent, such as those sold by Earth Nurture or EPI, may result in a plant-based blend that degrades in a wide variety of environments.

In yet another embodiment, solid fillers may be added to a biodegradable plastic in a foaming process. Solid fillers may be particulate, including talc, or may include elongated fillers. This structure may have bubbles with a uniform cellular density, may include one or two skins on its surface, and may have cellular and/or crystallinity gradient. Incorporating solid fillers in quantities over 5% by weight may reduce the cost of a panel.

The incorporation of bactericide may result in a product with resistance to bacteria growth, which may be useful in foodservice applications. The incorporation of fertilizer may be useful in agricultural applications, in which a plant container may help nourish the plant which it holds. In seed starter applications, a seed may be planted in a fertilizing container; the seed starter and plant may then be planted together, creating a system in which the plant is nourished by the degrading pot. Crystallizing additives may be useful in creating semi-crystalline polymers that withstand higher temperatures. It may be desirable to incorporate a filler material that increases diffusion through the polymer, including small tubular structures and porous filler materials, in order to allow more rapid saturation. A chemical sizing may be added to the filler, or the surface of the materials chosen, in order to create micro-channels around the filler to increase saturation rates.

While the detailed description above has been expressed in terms of specific examples, those skilled in the art will appreciate that many other configurations could be used.

Accordingly, it will be appreciated that various equivalent modifications and combinations of the above-described embodiments may be made without departing from the spirit and scope of the invention.

The invention claimed is:

1. An article, comprising:
a non-laminated polymer sheet including at least 60% by weight of a polylactic acid polymer material, the non-laminated polymer sheet having a first outer region, a second outer region, and an inner region disposed between the first outer region and the second outer region,
the first outer region and the second outer region including cells having a dimension of 50 micrometers or less, and
the inner region including cells having a dimension of at least 51 micrometers,
wherein the non-laminated polymer sheet withstands deformation when at least one of the first outer region and the second outer region are exposed to a temperature of at least 180° F., and
wherein the cells in the first outer region, the second outer region, and the inner region are formed by heating the non-laminated polymer sheet after the non-laminated polymer sheet has been exposed to a gas at a pressure of greater than 500 PSI for a predetermined time period, the predetermined time period sufficient to at least partially saturate the non-laminated polymer sheet with the gas, and less than 15 minutes.

2. The article of claim 1, wherein the cells in the inner region are elongated and have a length to width aspect ratio of at least 3:1.

3. The article of claim 1, wherein the non-laminated polymer sheet is a non-planar formed shape.

4. The article of claim 3, wherein the non-planar formed shape is a carton.

5. The article of claim 3, wherein the non-planar formed shape includes a hinge.

6. The article of claim 1, further comprising:
a skin disposed on at least one of the first outer region and the second outer region.

7. The article of claim 1, further comprising:
a coating disposed on at least one of the first outer region and the second outer region.

8. The article of claim 1, wherein the non-laminated polymer sheet includes filler.

9. The article of 8, wherein the filler is talc.

10. The article of claim 1, wherein a surface of the non-laminated polymer sheet has a surface roughness of greater than 0.5 microns.

11. The article of claim 1, wherein a surface of the non-laminated polymer sheet has a gloss of 30% or less.

12. The article of claim 8, wherein the filler has an aspect ratio of at least 1:1.5.

13. The article of claim 1, further comprising:
a solid core disposed in the inner region.

14. The article of claim 1, further comprising:
an additive.

15. The article of claim 14, wherein the additive is a crystalizing additive.

16. The article of claim 14, wherein the polylactic acid polymer material has a first degradation rate, and the non-laminated polymer sheet with the additive has a second degradation rate greater than the first degradation rate.

17. The article of claim 14, wherein the additive is a polybutyl succinate.

18. The article of claim 14, wherein the additive is a polyhydroxyalkanoate.

19. The article of claim 14, wherein the additive is a polycaprolactone.

20. The article of claim 19, wherein the polycaprolactone is at least 0.5% by weight of the non-laminated polymer sheet.

21. The article of claim 14, wherein the additive is an enzymatic agent.

22. The article of claim 14, wherein the additive is an oxo-degradation agent.

23. The article of claim 14, wherein the additive is a bactericide.

24. The article of claim 14, wherein the additive is a fertilizer.

25. An article, comprising:
a non-laminated polymer sheet including at least 60% by weight of a polylactic acid polymer material, the non-laminated polymer sheet having a first outer region, a second outer region, and an inner region disposed between the first outer region and the second outer region,
the first outer region and the second outer region including a first plurality of cells having a dimension of 50 micrometers or less, and
the inner region including a second plurality of cells having a dimension of at least 51 micrometers,
wherein the first plurality of cells and the second plurality of cells are formed by heating the non-laminated polymer sheet after the non-laminated polymer sheet has been exposed to a gas at a pressure of greater than 500 PSI for a predetermined time period sufficient to at least partially saturate the non-laminated polymer sheet with the gas, and less than 15 minutes.

26. The article of claim 25, wherein the second plurality of cells are elongated and have a length to width aspect ratio of at least 3:1.

27. The article of claim 25, wherein the non-laminated polymer sheet withstands deformation when at least one of the first outer region and the second outer region are exposed to a temperature of at least 180° F.

28. An article, comprising:
a non-laminated polymer sheet including at least 60% by weight of a polylactic acid polymer material, the non-laminated polymer sheet having a first outer region, a second outer region, and an inner region disposed between the first outer region and the second outer region,
the first outer region and the second outer region including a first plurality of cells having a dimension of 50 micrometers or less, and
the inner region including a second plurality of cells having a dimension of at least 51 micrometers,
wherein the cells in the first outer region, the second outer region, and the inner region are formed by heating the non-laminated polymer sheet after the non-laminated polymer sheet has been exposed to a gas at a pressure of greater than 500 PSI for a predetermined time period, the predetermined time period sufficient to at least partially saturate the non-laminated polymer sheet with the gas, and less than 15 minutes.

29. The article of claim 28, wherein the cells in the inner region are elongated and have a length to width aspect ratio of at least 3:1.

30. The article of claim 28, wherein the non-laminated polymer sheet withstands deformation when at least one of the first outer region and the second outer region are exposed to a temperature of at least 180° F.

31. The article of claim 28, wherein a surface of the non-laminated polymer sheet has a surface roughness of greater than 0.5 microns.

32. An article, comprising:
a non-laminated polymer sheet including at least 60% by weight of a polylactic acid polymer material, the non-laminated polymer sheet having a first outer region, a second outer region, and an inner region disposed between the first outer region and the second outer region,
the first outer region and the second outer region including a first plurality of cells having a dimension of 50 micrometers or less, and
the inner region including a second plurality of cells having a dimension of at least 51 micrometers,
wherein the cells in the inner region are elongated, and
wherein the cells in the first outer region, the second outer region, and the inner region are formed by heating the non-laminated polymer sheet after the non-laminated polymer sheet has been exposed to a gas at a pressure of greater than 500 PSI for a predetermined time period, the predetermined time period sufficient to at least partially saturate the non-laminated polymer sheet with the gas, and less than 15 minutes.

33. The article of claim 32, wherein the non-laminated polymer sheet withstands deformation when at least one of the first outer region and the second outer region are exposed to a temperature of at least 180° F.

34. The article of claim 32, wherein a surface of the non-laminated polymer sheet has a surface roughness of greater than 0.5 microns.

35. The article of claim 32, wherein the elongated cells in the inner region have a length to width aspect ratio of at least 3:1.

* * * * *